(12) United States Patent
Williams et al.

(10) Patent No.: US 8,584,454 B2
(45) Date of Patent: Nov. 19, 2013

(54) POWER CAPTURE DEVICE

(75) Inventors: Ivan Patrick Williams, Shrewsbury (GB); John Malcolm Hepworth, Rugby (GB); David Homfray Slater, Kings Caple (GB)

(73) Assignee: Sybre Limited (GB)

( * ) Notice: Subject to any disclaimer, the term of this patent is extended or adjusted under 35 U.S.C. 154(b) by 171 days.

(21) Appl. No.: 12/991,117

(22) PCT Filed: Feb. 25, 2010

(86) PCT No.: PCT/GB2010/050319
§ 371 (c)(1),
(2), (4) Date: Mar. 29, 2011

(87) PCT Pub. No.: WO2010/097622
PCT Pub. Date: Sep. 2, 2010

(65) Prior Publication Data
US 2011/0173967 A1    Jul. 21, 2011

(30) Foreign Application Priority Data

Feb. 26, 2009    (GB) .................................. 0903272.3

(51) Int. Cl.
*F03B 13/18*    (2006.01)
(52) U.S. Cl.
USPC ................... 60/497; 60/499; 60/505; 60/506
(58) Field of Classification Search
USPC .................................................. 60/495–506
See application file for complete search history.

(56) References Cited

U.S. PATENT DOCUMENTS 4,196,591 A    4/1980    Wallace

FOREIGN PATENT DOCUMENTS

| DE | 202 01 389 | 5/2002 | |
| DE | 20201389 U1 * | 5/2002 | ............... F03B 7/00 |
| GB | 2 428 747 | 2/2007 | |

OTHER PUBLICATIONS

International Search Report, issued Feb. 14, 2011, for PCT International Patent Application No. PCT/GB2010/050319.

* cited by examiner

*Primary Examiner* — Thomas Denion
*Assistant Examiner* — Philip Eklem

(57) ABSTRACT

An electrical power generation device (10) utilising movement of the ocean comprising an elongate column (12) journalled in a support structure (14) for universal movement relative thereto. The support structure is adapted to be secured to the sea bed so that the column is disposed for at least partially submerged universal motion relative to the support structure automatically in response to force transmitted by movement of the ocean in which the support structure and the column reside. The support structure may contain an array of piston and cylinder assemblies (32) in such a construction the supported end (26) of the column is adapted to actuate one or more of the piston and cylinder assemblies in random sequence as a result of movement of the column relative to the support structure. The piston and cylinder assemblies are operatively connected to drive electrical power generators (40).

17 Claims, 10 Drawing Sheets

POWER CAPTURE DEVICE

CROSS-REFERENCE TO RELATED APPLICATIONS

This application is a National Phase Application of PCT International Application No. PCT/GB2010/050319, International Filing Date Feb. 25, 2010, claiming priority of Great Britain Patent Application, 0903272.3, filed Feb. 26, 2009, each of which are hereby incorporated by reference in their entirety.

The present invention relates to a power capture device and, in a preferred embodiment, to an ocean based power generating device. A vast array of technologies have been proposed in the generation of power from the oceans in a number of wave and tidal generation technologies which are at various stages of development. A selection of the main system types are described below.

Wave Energy Devices

Wave energy devices operate using one of a number of principles. Devices can be located on the shoreline, near shore or off shore. Early devices were shoreline based but more recent concepts have focused on off shore sites where wave energies are higher but conditions can be more challenging.

Oscillating Water Column Systems

In these systems, waves are trapped in a chamber and the rise and fall of the water moves a column of air which drives a turbine. These devices can be located either on the shoreline (e.g. built into cliffs or break waters) or in floating offshore devices.

TAPCHAN Systems

These shoreline based systems use a gradually tapering channel (hence TAP-CHAN) to amplify wave heights to a level that allows a raised reservoir or lagoon a few metres above normal sea level to be filled. Electricity is generated as the water passes from the reservoir back to the sea via a low head turbine.

Point Absorbers

In these devices, the motion of a buoyant object is used to drive a generator. The complete system comprises a float (which may rest at or under the surface of the sea), generating equipment and, in most cases, a platform/foundations fixed to the seabed. The movement of the float (usually relative to the fixed platform) drives the generating equipment to produce electricity.

Hinged Contour Devices

These devices use the relative motion of a series of floating structures to generate electricity. The vertical and/or horizontal movement between the floats can be captured using either hydraulic or mechanical couplings.

Overtopping Devices

In these devices, waves flow over a structure and electricity is generated by using the falling water to directly, or indirectly, power a turbine. These types of devices can be located either onshore or offshore.

Tidal Energy Devices

Tidal devices fall into two main categories: Tidal barrages, and Tidal current turbines. Barrages have already been tried and installed in a number of places, and whilst they have proved successful, their cost and environmental impact mean that current turbines are the leading technology concepts being proposed at present.

Barrages

Tidal barrages are installed in tidal estuaries or inlets and work by holding back the flow of water at high/low tides. Once a sufficient head of water has been formed, the water can be released through turbines to generate electricity.

Tidal Stream Devices

Operating using the same principle as wind turbines, tidal stream turbines generate power directly from the flow of the tides. They are installed in the sea at places with fast tidal currents or where continuous currents are fast and strong enough to produce energy from the water flow. The turbines can be orientated either horizontally or vertically and systems can be either floating or secured directly to the seabed.

The present invention does not utilise any of the principles adopted in the known devices referred to above but instead harnesses the inertial force, e.g. tide, swell, waves, current, from an ocean immersed mass relative to a fixed point. The preferred embodiment of the device of the present invention takes the form of an elongate buoyant column journalled in a support structure and which can move in three dimensions which, seen from above, appears as a classic lissajou motion and a superimposed movement caused by vortex shedding.

The buoyant pivotal column moves like an inverted pendulum in the wind. However, unlike a pendulum, whose bob describes in two dimensions an arc of fixed radius (the length of the string), a pivotal column moves (in two dimensions), along the appropriate horizontal chord of a circle. In three dimensions, seen from above, this appears as a classic Lissajou figure of eight but the column is subject to vortex induced motion which keeps it virtually in constant motion.

Vortex induced motion is an unsteady flow that takes place in special flow velocities (according to the size and shape of the cylindrical body). In this flow, vortices are created at the back of the body and detach periodically from either side of the body and this is known as vortex shedding. Vortex shedding is caused when a fluid flows past a blunt object. The fluid flow past the object creates alternating low-pressure vortices on the downstream side of the object. The object will tend to move towards the low-pressure zone. Eventually, if the frequency of vortex shedding matches the resonance frequency of the structure, the structure will begin to resonate and the structure's movement can become self-sustaining.

It is this movement which can be harnessed to produce electrical energy.

One aspect of the present invention provides a power capture device utilising movement of a fluid body, which device comprises an elongate buoyant column journalled in a support structure for universal movement relative thereto, the support structure being adapted to be secured to the ground with the column disposed in the path of fluid flow so that the column experiences vortex induced motion which creates universal motion relative to the support structure automatically in response to force transmitted by fluid flow past the column, wherein the support structure includes actuating means to convert movement of the column into an operative force to drive electrical power generating means.

In some preferred constructions according to the invention, the buoyant column may be adapted to stand upright relative to the support structure.

In other constructions, the buoyant column may be adapted to be suspended from the support structure.

According to a feature of this aspect of the invention, the support structure may be adapted to be secured to the bed or banks of a body of water, such as the sea bed or a river bed or bank and wherein the column is disposed for at least partially submerged universal motion relative to the support structure automatically in response to force transmitted by the flow of water past the column.

According to another feature of this aspect of the invention, the actuating means may comprise a plurality of piston and cylinder assemblies. Preferably, an array of piston and cylinder assemblies is provided by the support structure, and wherein the column is adapted to actuate the piston and cylinder assemblies in random sequence as a result of movement of the column relative to the support structure. It is also preferable that the array of piston and cylinder assemblies are disposed to present means to actuate the heads of the pistons to the supported end of the column which causes reciprocal movement of the pistons in random sequence as a result of said movement of the column. It is further preferred that the array of piston and cylinder assemblies are disposed in a part spherical arrangement and the supported end of the column includes a spherical actuator which rides around the part spherical arrangement of the piston and cylinder assemblies to cause said reciprocal movement of the pistons in random sequence. Even more preferably, the piston and cylinder assemblies are arranged in a plurality of concentric annular banks within a part spherical recess within the support structure.

According to another feature of the invention, in some constructions the array of piston and cylinder assemblies may be hydraulically or pneumatically connected to drive electrical power generating means contained within the support structure. In other constructions, the array of piston and cylinder assemblies may be mechanically actuated to drive electrical power generating means contained within the support structure.

According to a further feature of this aspect of the invention, the column may be journalled in the support structure by means of a ball and socket joint arrangement.

According to yet another feature of this aspect of the invention, the supported end of the column includes the ball of the ball and socket joint arrangement and the socket of the ball and socket joint arrangement is provided by a concave annulus within the support structure. Preferably, the column includes an extension within the support structure beyond the ball of the ball and socket joint arrangement which actuates said means in random sequence to drive electrical power generating means as a result of movement of the column relative to the support structure.

According to a still further feature of this aspect of the invention, the support structure and the column may have complementary formed faces to limit the universal movement of the column relative to the support structure.

BRIEF DESCRIPTION OF THE DRAWINGS

Embodiments of the invention will now be described, by way of example, with reference to the accompanying drawings, in which:—

Figure 1:
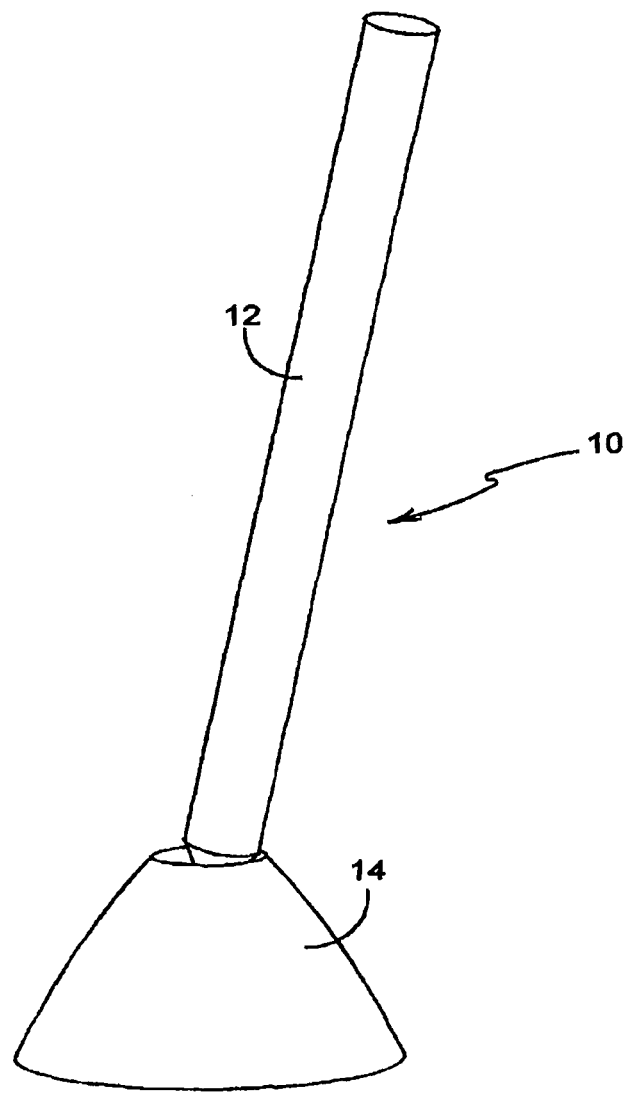
FIG. 1 is a simplistic perspective view of the device in which the elongate column is shown moveably connected relative to a fixed support structure.
Figure 2:
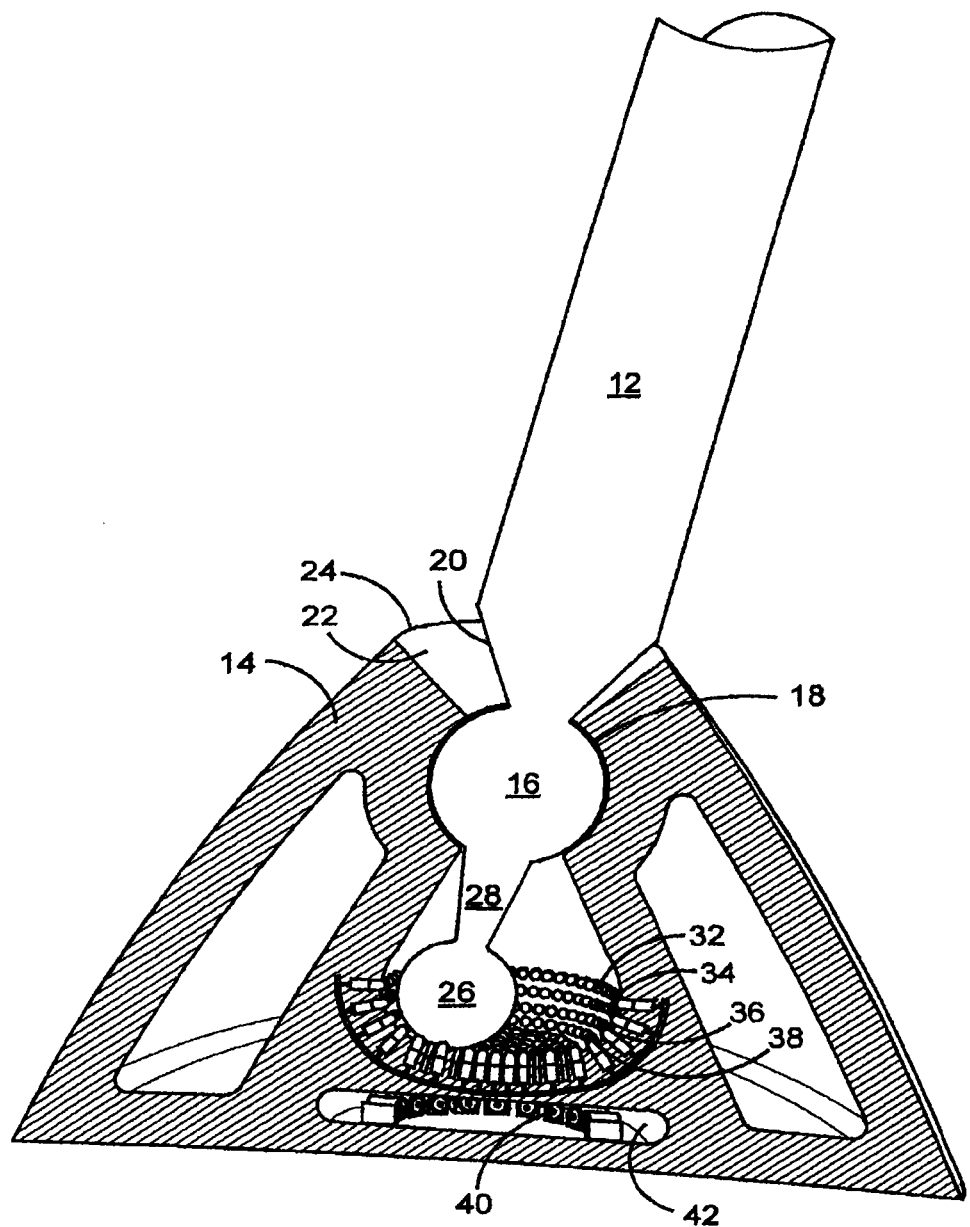
FIG. 2 is an enlarged perspective view of the support structure and the lower end of the column shown partially in vertical cross-section.
Figure 3:
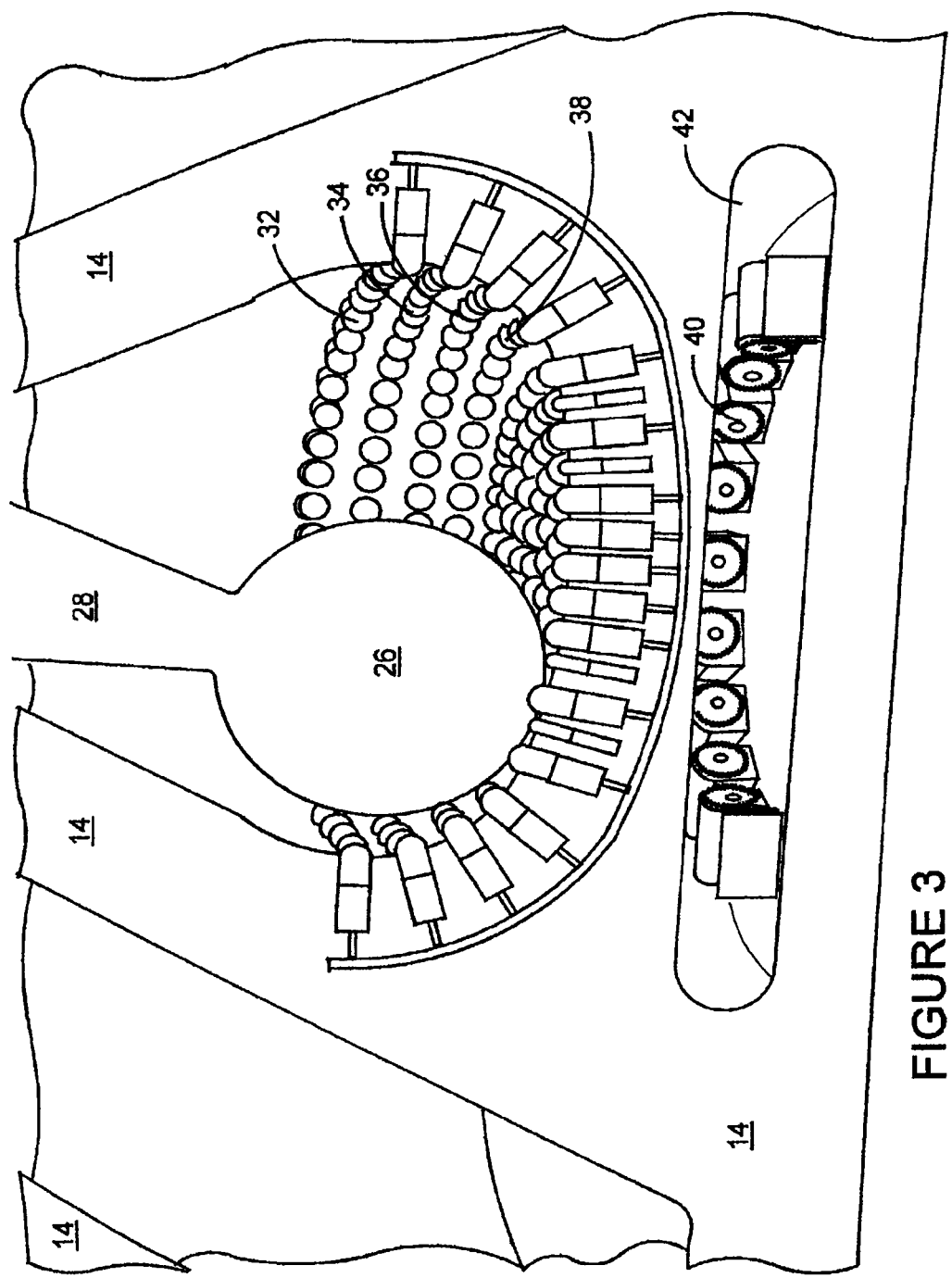
FIG. 3 is a further enlargement of the view shown in FIG. 2 showing the base of the column and an array of hydraulicipiston and cylinder assemblies.
Figure 4:
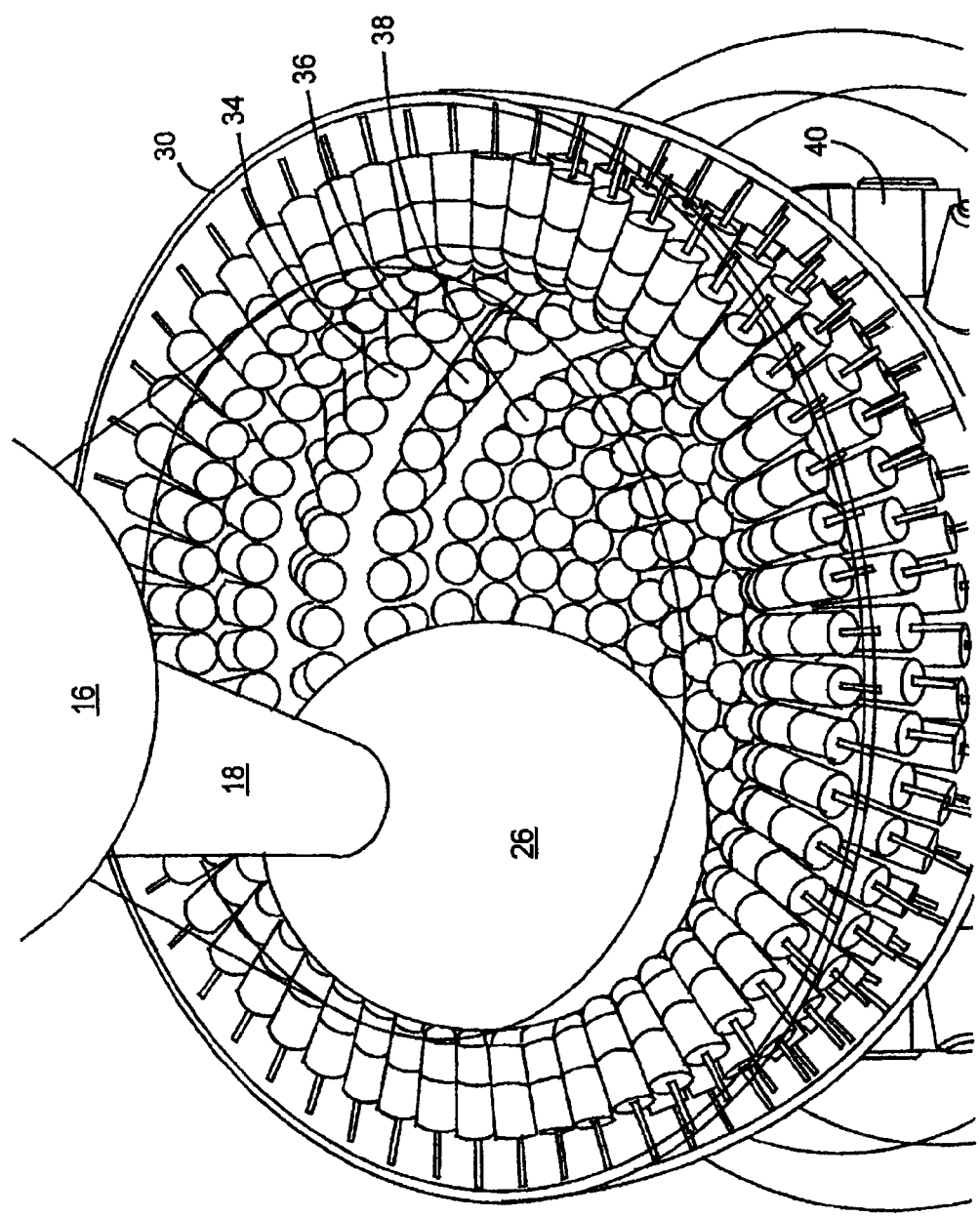
FIG. 4 is a still further enlarged view of the view of the base of the column showing annular banks of the piston and cylinder assemblies.

Referring first to FIGS. 1 to 6 of the drawings, the device 10 comprises an elongate buoyant column 12, which is received and journalled in a support structure 14 adapted to be secured to the sea bed. It is envisaged that the column may have a length of the order of 200 m and be of up to 40 m in diameter. It is therefore a massive structure but may be formed from a suitable plastics material.

It is further envisaged that the column 12 can be formed from a stack of modular sections of annular form. If the column is formed as a modular structure its height can be varied for different water depths. Moreover, although this structure is non-intrusive when installed, it readily can be repaired if damaged by impact.

The column is journalled in the support structure by means of a ball and socket joint adjacent the upper end of the support structure. The ball and socket joint comprises a spherical portion 16 (FIGS. 2 and 4) of the column adjacent its lower extremity and a concave annulus 18 formed in the support structure. Thus, the column can move universally relative to the support structure automatically in response to force transmitted by the various complex movements of the ocean. However, the overall movement of the column is limited by shaped complementary mating bearing surfaces 20, 22 provided by the column and the head 24 of the support structure, respectively.

The extremity of the supported end of the column is formed with a spherical actuator 26 which is spaced from the spherical portion 16 by an integral arm 28. The spherical actuator 26 operates within a semi-spherical bowl 30 formed within the support structure. The spherical actuator 26 rides around protruding spheres which actuate the pistons in an array 32 of piston and cylinder assemblies. The pistons are actuated in random sequence consequent upon the movement of the column. As shown, and best seen in FIGS. 3 and 4 the array of piston and cylinder assemblies are arranged in the bowl 30 in a number of concentric annular banks, e.g. 34, 36, 38. The piston and cylinder assemblies are connected by suitable hydraulic and/or pneumatic circuits to a number of electrical power generators 40 which are housed in a chamber 42 of the support structure disposed below the bowl 30. The actuation of the pistons and the connecting fluidic circuitry is such that continuous generation of electrical power is obtained through the constant motion of the column. However, it is envisaged that the electrical power generating means may be housed separately from the support structure and may be located on-shore so that the device pumps hydraulic fluid, which could be sea water, to energy accumulators for the remote generation of electricity.

Figure 5:
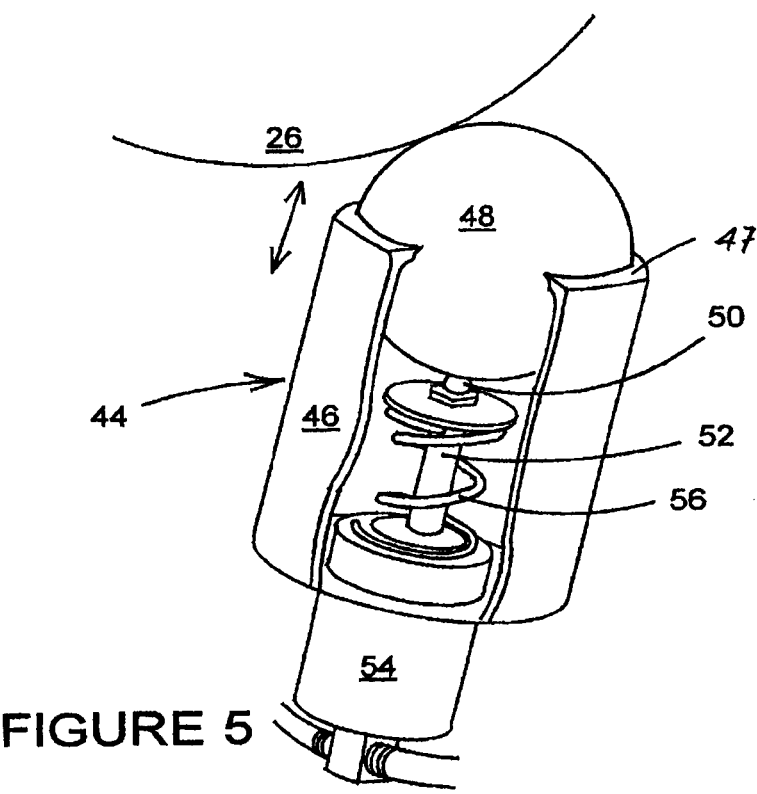
FIG. 5 is a perspective view of one mechanical arrangement for the actuation of the hydraulic piston and cylinder assemblies.
Figure 5A:
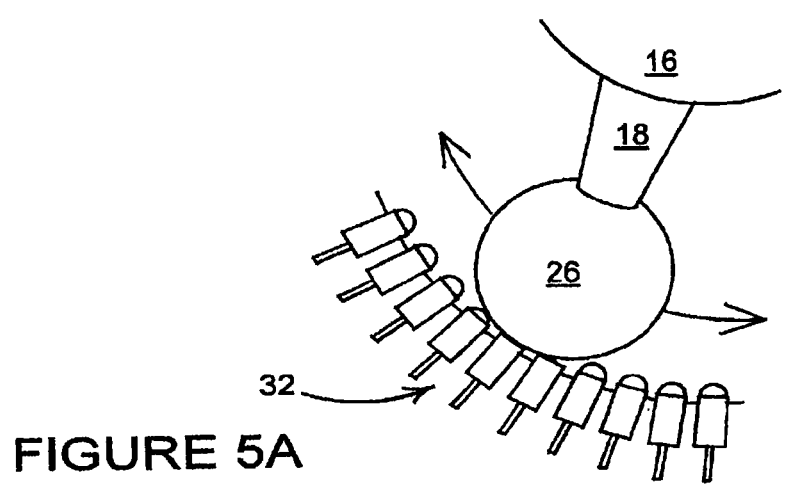
FIG. 5a is a sketch of the lower end of the device.

Referring now to FIG. 5 of the drawings details one embodiment of a single piston and cylinder assembly 44 of the array 32 is shown. The piston and cylinder assembly 44 comprises a housing in the form of a cylindrical sleeve 46, each of which is contained in bores formed in the semi-spherical bowl 30. One end of the sleeve 46 provides a seat for a spherical force transmission element, which preferably is a ball 48. Ball 48 can rotate relative to the sleeve 46 and move axially within it, but is constrained from being dislodged from the open top of the sleeve by an inwardly directed lip 47. The spherical actuator 26 at the supported end of the column 12 periodically bears down on each of the transmission balls 48 as the spherical actuator passes over them and depresses the transmission ball against a compression spring into the sleeve. The transmission ball abuts a spherical end 50 of a piston rod 52 of a hydraulic ram 54. Thus, axial movement of the transmission ball 48 down the sleeve 46 depresses the piston rod against the force of a return spring 56 to operate the piston of the hydraulic ram. The hydraulic ram causes hydraulic fluid to be transferred to an accumulator means which, in turn, drives one or more electrical generators. When the spherical actuator 26 is out of contact with that particular piston and cylinder assembly, the transmission ball returns to its upper inactive position at the top end of the sleeve by the restorative force of the return spring 56.

Figure 6:
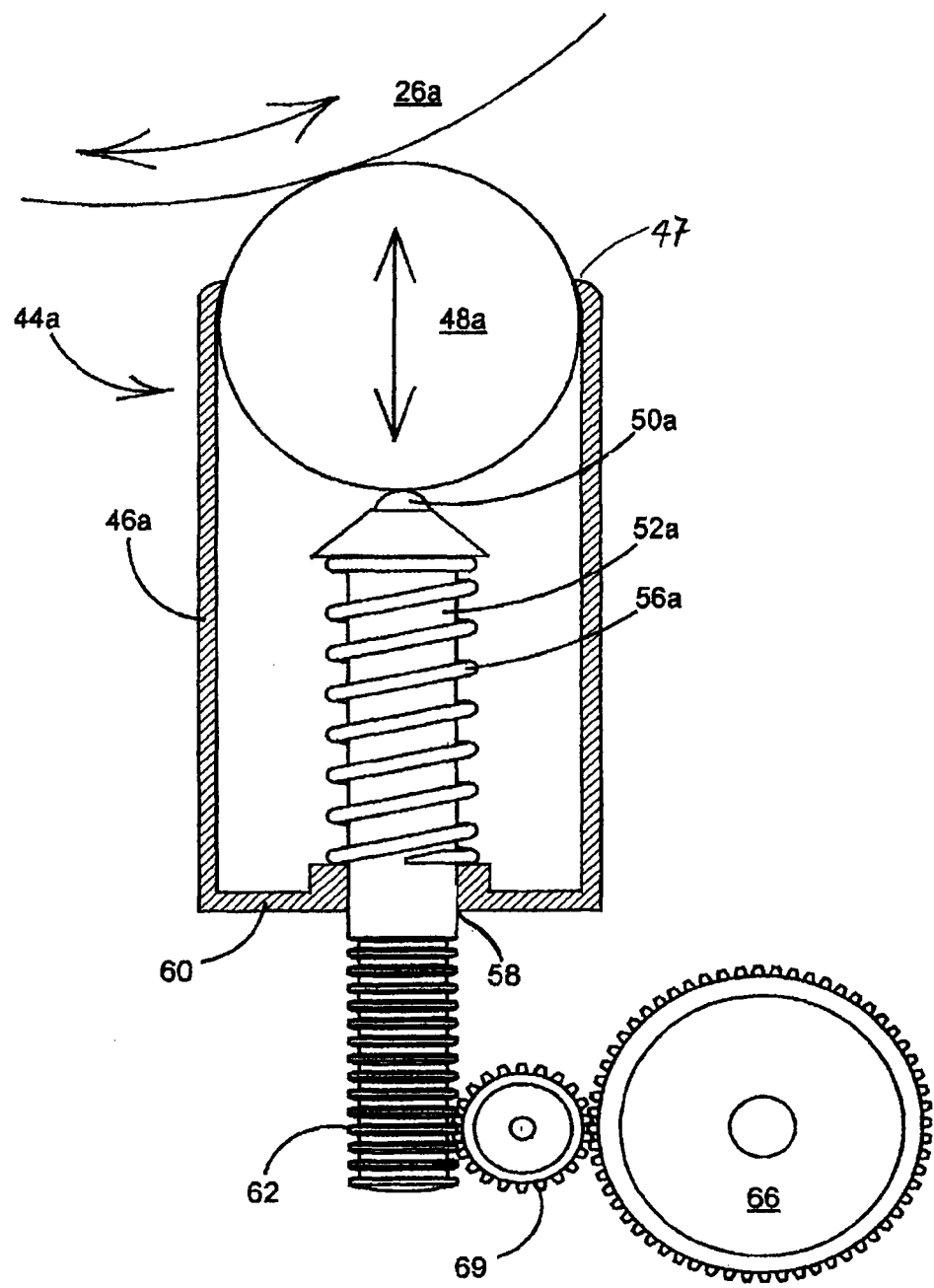
FIG. 6 is mechanical arrangement for transferring movement of the column into rotational movement to drive generators.

Referring now to FIG. 6 of the drawings, another embodiment of piston and cylinder assembly is shown, and like parts to those of FIG. 5 are designated like reference numerals, with the addition of suffix 'a' and function in a similar manner.

In this alternative embodiment, the piston and cylinder assembly 44a does not involve the inclusion of hydraulic or pneumatic components but rather is a mechanical assembly. Thus, the piston rod 52a reciprocates within sleeve 46a, against the force of return spring 56a, and protrudes through an opening 58 formed in an end wall 60 of the sleeve. The exposed lower end of the piston rod is formed with an axial gear 62 which meshes with and drives planet gear wheel 69 in consequence of reciprocal movement of the piston rod 52a. Gear 69 meshes with and drives a sun drive gear 66 of an electrical generator to produce electrical power.

Figure 7:
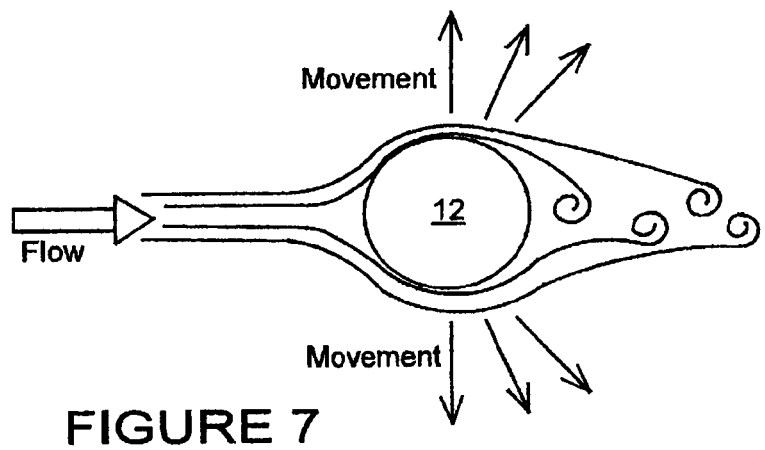
FIG. 7 is a top view of the column showing movement as a result of vortex shedding.
Figure 8:
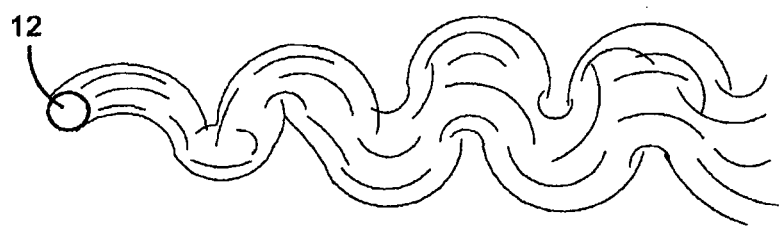
FIG. 8 is a view similar to FIG. 7 emphasising vortex induced eddies.

FIGS. 7 and 8 of the drawings illustrate the phenomena of vortex shedding to which the buoyant column is subject when disposed in a fluid flow.

Figure 9:
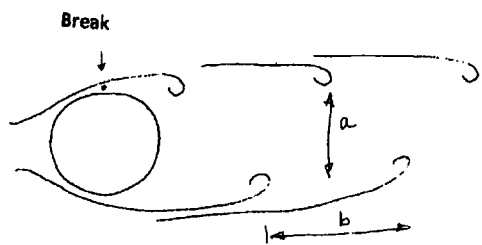
FIG. 9 is a schematic illustration of the oscillation of a buoyant column.

Referring to FIG. 9, the buoyant column is designed to extract energy from tidal flows of 2-6 m/s, and is caused to oscillate from side to side by the process of vortex shedding.

The following equation applies to the frequency of oscillations due to vortex shedding, but this may be perturbed if the oscillations are damped.

$$\frac{fd}{u_\infty} = 0.198\left(1 - \frac{19.7}{R_e}\right)$$

Where Re is the Reynold's number and $$R_e = \frac{u_\infty d}{v}$$

v=water.viscosity=0.001 Pa·s
ρ=water.density=1025 kg/m³
d=device.diameter
$u_\infty$=water.velocity
h=deviceheight
f=frequency
T=period
$C_L$=liftcoefficient=1 to 3.5

Then $$f = 0.198\left(1 - \frac{19.7v}{u_\infty d}\right)\frac{u_\infty}{d}$$

The lift force due to the vortex is given by L=$C_L$ (0.5 ρu²) per unit area. $C_L$ is uncertain in the vortex situation, but is probably between 1 and 3.5.

A value of 1.0 is used here.

Figure 10:
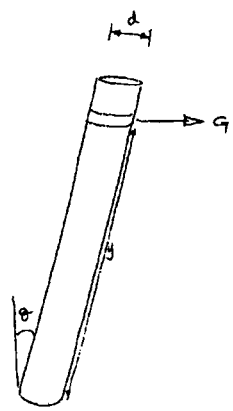
FIG. 10 is a schematic illustration of a band of given dimensions.

Referring to FIG. 10, consider a band 1 metre thick, a distance "y" metres above the fulcrum, then the total force from this band is taken to be the lift force *0.5*diameter G=$C_L$0.5d Assuming half of the diameter is the area over which the lift occurs.

The torque due to the force G arising from this band is then
τ=Gy

The total torque on the device is obtained by integrating the effect of all bands from y=0 to y=h, this gives Γ=$\int_0^h$Gydy
Γ=0.5Gh²

If the buoyant column swings by θ radians then the work done or energy is E=Γθ J (Joules)
The power is then P=E/T or P=Ef J/s or W
Substituting from all of the above $$P = \frac{0.198}{8}\rho u^2 d\theta h^2\left(1 - \frac{19.7v}{u_\infty d}\right)\frac{u_\infty}{d} \text{ Watts}$$

$$P = 0.02475\rho u^3 \theta h^2\left(1 - \frac{19.7v}{u_\infty d}\right) \text{ Watts}$$

To estimate the available power in the water flow, the power is based on standard energy flux and area, with the area being the frontage area of the device (hd). This is very much an estimate, and it may be that in reality it is smaller, or on the other hand, it may be larger as the area swept out by the device may be the real area ie 2hθ.

$P_w$=0.5Aρu³ Watts

But we can take A=dh and so $P_w$=0.5dhρu³ Watts

The conversion efficiency will therefore be $$\eta = \frac{P}{P_w}$$

$$\eta = \frac{P}{P_w} = \frac{0.198}{8}\rho u^3 \theta h^2\left(1 - \frac{19.7v}{u_\infty d}\right) / 0.5 dh\rho u^3$$

$$\eta = \frac{P}{P_w} = \frac{0.198*2}{8}\left(1 - \frac{19.7v}{u_\infty d}\right)\frac{\theta h}{d}$$

$$\eta = 0.0495\left(1 - \frac{19.7v}{u_\infty d}\right)\frac{\theta h}{d}$$

The above calculations are used to obtain some numerical values, to some extent subject to a number of uncertainties.

The following calculations are for a column length of 200 m from pivot to water surface. The column diameter varies from 5 to 40 m, and the water velocity runs up to 6 m/s.

Energy

Figure 11:
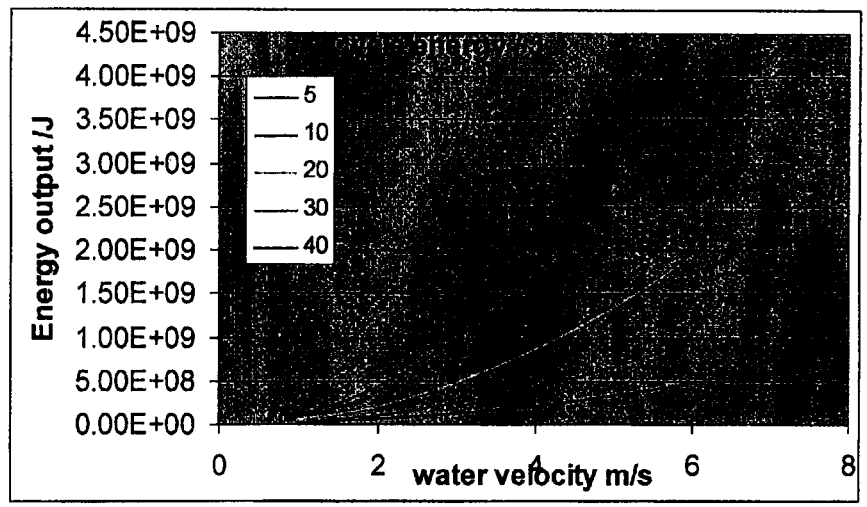
FIG. 11 is a graph representing the energy captured in each cycle.

As shown in FIG. 11, the energy captured in each cycle is strongly dependent on device diameter and water velocity.

Period

Figure 12:
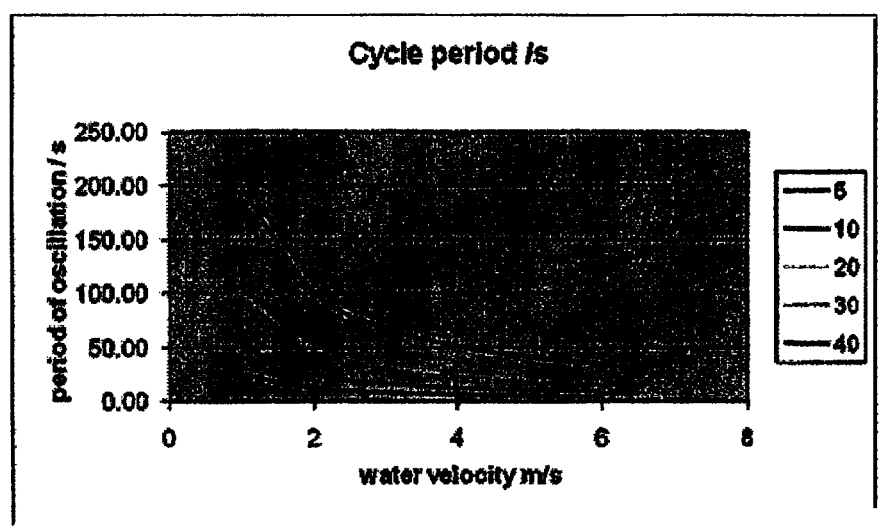
FIG. 12 is a graph representing the period of vortex induced oscillations.

The period of vortex induced oscillations is shown in FIG. 12, and is also strongly dependent on device diameter and water velocity.

Power

Figure 13:
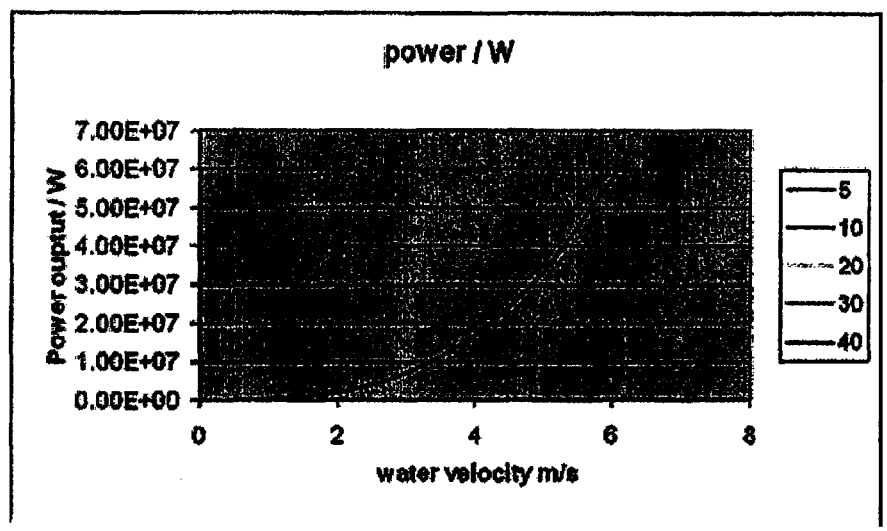
FIG. 13 is a graph representing the cycle power.

Referring to FIG. 13, computing the cycle power is then achieved by dividing the cycle energy by the period, and this has the important outcome of reducing all of the curves for column diameter onto the same power curve. This occurs because increasing the column diameter increases the energy in each cycle but since the oscillation period increases in line with this, the overall effect on power output is that it is independent of diameter. On the scale shown in FIG. 13 2.00E+07 means 20MW.

Efficiency

Figure 14:
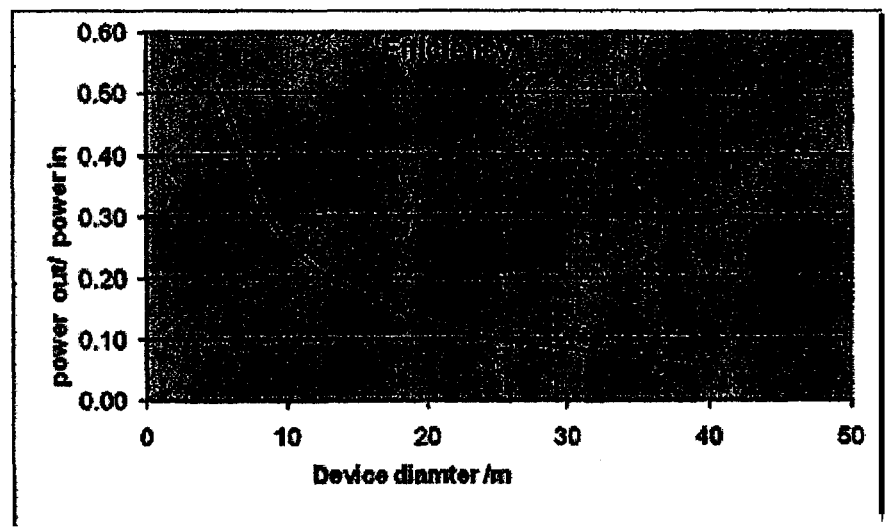
FIG. 14 is a graph representing the efficiency of the device.

Referring to FIG. 14, it is possible to estimate the efficiency by considering the output power relative to the power in the water flow. This has a number of uncertainties and may be of little value, but the trend shown suggests that the efficiency is better at lower device diameters. The single curve shown in FIG. 14 applies to all water velocities.

Tank and Model Tests.

Small scale model tests have been conducted in a flume tank and load/displacement measurements were made subsequently.

Assuming the model to be at a scale of 1:600, (0.33 m:200 m), then using Froude scaling, the flow in the tank, which was variously 10,20,30,40 litres per second, corresponded to a velocity of 2.7, 5.4, 8.2 and 10.8 m/s respectively.

The load/displacement measurement result of 15N for the force corresponds to $15*600^3=3.24GN$ If the column swings through 15 degrees then the Energy=848 MJ From the tank test results the period of motion was of the order of 1 s, which corresponds to a full scale period of $1*600^{0.5}=24.49$ s The full scale power will therefore be 848 MJ/24.49 s=34 MW The maths and small scale tests show the potential for the concept. The body moves in the manner predicted and on the basis of many assumptions output power levels of 10's of MW are estimated. A full scale device of 200 m, and any diameter from 5 to 40 m might produce 50 MW in water velocities of 6 m/s.

The assumptions of effective surface area, lift coefficient, vortex mechanism, influence of damping, swept area etc could be refined, and yield superior performance A lift coefficient of 1 was used in the present calculations, whereas it might be as high as 3.5, which would give a direct improvement of a factor of 3.5. On the other hand efficiencies are unlikely to exceed 0.59 (59%) as this is a theoretical limit in open flow according to Lanchester-Betz criterion.

It is also envisaged within the scope of the present invention that the device could be installed in an inverted attitude so that the column is suspended from the support structure in a body of water. In such an arrangement the lower free end of the column would be weighted and would act like a pendulum with universal motion. The support structure itself would be supported by a gantry spanning a natural or man-made channel through which water flows or the gantry could span the banks of a river.

In a still further embodiment of the invention, it is envisaged that the device could be modified for use as a wind powered device. In this arrangement the column could be formed from a light weight fabric, plastics or other suitable material providing a sealed buoyant cylinder filled with air or helium.

The invention claimed is:

1. A method of capturing power from a flow of fluid comprising the steps of:

providing a device having an elongate column in a journalled association at or adjacent to a first extremity thereof with a support structure for universal movement thereabout defined by said journalled association, the column being buoyant in the fluid to a biased orientation, the support structure being adapted to be fixed with the column disposed in a fluid flow in use so that by its shape, position and length the column experiences variable motion due to an induced vortex effect at a downstream side of the column in the flow balanced by the buoyance of the column to the biased orientation which creates universal motion relative to the support structure due to fluid flow past the column, wherein the device includes an actuator that converts movement of the first extremity of the column into an operative force for driving an electrical generator; and, generating electricity to capture power.

2. A power capture device for utilizing movement of a fluid body in use, which device comprises an elongate column in a journalled association at or adjacent to a first extremity thereof with a support structure for universal movement thereabout defined by said journalled association, the column being buoyant in the fluid to a biased orientation, the support structure being adapted to be fixed with the column disposed in a fluid flow in use so that by its shape, position and length the column experiences variable motion due to an induced vortex effect at a downstream side of the column in the flow balanced by the buoyance of the column to the biased orientation which creates universal motion relative to the support structure due to fluid flow past the column, wherein the device includes an actuator that converts movement of the first extremity of the column into an operative force for driving an electrical generator.

3. A power capture device according to claim 2, wherein the buoyant column is adapted to stand upright relative to the support structure.

4. A power capture device according to claim 2, wherein the buoyant column is adapted to be suspended from the support structure.

5. A power capture device according to claim 2, wherein the support structure is adapted to be secured to the bed or banks of a body of water, wherein the column is disposed for at least partially submerged universal motion relative to the support structure due to the flow of water past the column.

6. A power capture device according to claim 2, wherein the device comprises a plurality of piston and cylinder assemblies that are actuated by the actuator to produce the operative force to drive the electrical generator.

7. A power capture device according to claim 6, wherein an array of piston and cylinder assemblies is provided by the support structure, and wherein the column is adapted to actuate the piston and cylinder assemblies in random sequence as a result of movement of the column relative to the support structure.

8. A power capture device according to claim 7, wherein the array of piston and cylinder assemblies are disposed to present means to actuate heads of pistons to the supported end of the column which causes reciprocal movement of the pistons in random sequence as a result of said movement of the column.

9. A power capture device according to claim 8, wherein the array of piston and cylinder assemblies are disposed in a part spherical arrangement and the supported end of the column includes a spherical actuator which rides around the part spherical arrangement of the piston and cylinder assemblies to cause said reciprocal movement of the pistons in random sequence.

10. A power capture device according to claim 9, wherein the piston and cylinder assemblies are arranged in a plurality of concentric annular banks within a part spherical recess within the support structure.

11. A power device according to claim 7, wherein the array of piston and cylinder assemblies are hydraulically or pneumatically connected to drive electrical power generating means contained within the support structure.

12. A power device according to claim 7, wherein the array of piston and cylinder assemblies are mechanically actuated to drive electrical power generating means contained within the support structure.

13. A power device according to claim 2, wherein the column is journalled in the support structure by means of a ball and socket joint arrangement.

14. A power capture device according to claim 13, wherein the supported end of the column includes the ball of the ball and socket joint arrangement and the socket of the ball and socket arrangement is provided by a concave annulus within the support structure.

15. A power capture device according to claim 14, wherein the column includes an extension within the support structure beyond the ball of the ball and socket joint arrangement which actuates piston and cylinder assemblies in random sequence to drive said electrical power generator as a result of movement of the column relative to the support structure.

16. A power capture device of claim 2, wherein the support structure and the column have complementary formed faces to limit the universal movement of the column relative to the support structure.

17. A power capture device of claim 2 wherein the column comprises a stack of buoyant modular sections.

* * * * *